(12) United States Patent
Caruel

(10) Patent No.: US 10,787,995 B2
(45) Date of Patent: Sep. 29, 2020

(54) CONTROL DEVICE OF A VARIABLE SECTION NOZZLE AND THE IMPLEMENTATION METHOD THEREOF

(71) Applicant: SAFRAN AIRCRAFT ENGINES, Paris (FR)

(72) Inventor: Pierre Caruel, Gonfreville L'Orcher (FR)

(73) Assignee: Safran Aircraft Engines, Paris (FR)

( * ) Notice: Subject to any disclaimer, the term of this patent is extended or adjusted under 35 U.S.C. 154(b) by 266 days.

(21) Appl. No.: 15/619,858

(22) Filed: Jun. 12, 2017

(65) Prior Publication Data

US 2017/0276092 A1 Sep. 28, 2017

Related U.S. Application Data

(63) Continuation of application No. PCT/FR2015/053460, filed on Dec. 11, 2015.

(30) Foreign Application Priority Data

Dec. 11, 2014 (FR) ...................... 14 62234

(51) Int. Cl.
 *F02K 1/17* (2006.01)
 *F02K 3/06* (2006.01)
 (Continued)

(52) U.S. Cl.
 CPC ................. *F02K 1/17* (2013.01); *F02C 9/50* (2013.01); *F02K 3/06* (2013.01); *F02K 1/15* (2013.01);
 (Continued)

(58) Field of Classification Search
 CPC .......... F01D 17/00; F01D 17/02; F01D 17/04; F02K 1/06; F02K 1/08; F02K 1/12; F02K 3/075; F02K 3/04; F02K 3/06; F02K 1/17
 See application file for complete search history.

(56) References Cited

U.S. PATENT DOCUMENTS 3,030,771 A 4/1962 Hopper
5,303,545 A 4/1994 Larkin
(Continued)

FOREIGN PATENT DOCUMENTS

EP 0807897 11/1997
EP 0926332 6/1999
FR 2956163 8/2011

OTHER PUBLICATIONS

International Search Report for International Application PCT/FR2015/053460, dated Mar. 11, 2016.

*Primary Examiner* — Craig Kim

(74) *Attorney, Agent, or Firm* — Burris Law, PLLC

(57) ABSTRACT

The present disclosure provides a device for controlling a variable section ejection nozzle of a turbojet engine nacelle of an aircraft. The device includes a calculator adapted to determine a position setpoint of the nozzle and a management system of the servo-control of the position of the variable nozzle depending on the flow rate of the fuel supplying the turbojet engine. The management system includes at least one instantaneous flow rate sensor of the fuel and a management unit which is designed to compare the flow rate measured by the flow rate sensor with a theoretical fuel flow rate depending on the parameters of the flight of the aircraft, to determine a correction value of the position of the nozzle depending on the comparison of the measured flow rate and the theoretical fuel flow rate, and to correct the position setpoint of the nozzle according to the correction value.

9 Claims, 1 Drawing Sheet

(51) Int. Cl.
  *F02C 9/50* (2006.01)
  *F02K 1/15* (2006.01)
(52) U.S. Cl.
  CPC .... *F05D 2220/323* (2013.01); *F05D 2270/07* (2013.01); *F05D 2270/114* (2013.01); *F05D 2270/31* (2013.01); *F05D 2270/703* (2013.01); *F05D 2270/708* (2013.01); *F05D 2270/821* (2013.01)

(56) References Cited

U.S. PATENT DOCUMENTS

2013/0008145 A1\* 1/2013 Sundstrom ................ F02K 1/12
  60/226.2
2015/0285158 A1\* 10/2015 Hillel ..................... B64D 31/06
  60/772

\* cited by examiner

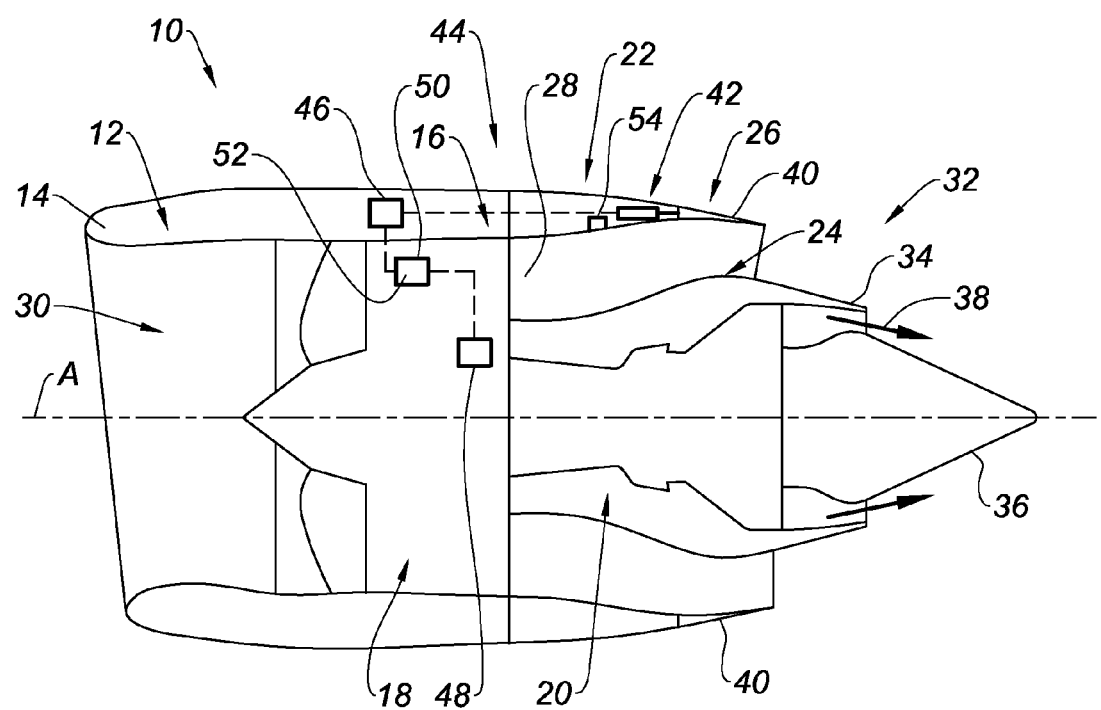

CONTROL DEVICE OF A VARIABLE SECTION NOZZLE AND THE IMPLEMENTATION METHOD THEREOF

CROSS-REFERENCE TO RELATED APPLICATIONS

This application is a continuation of International Application No. PCT/FR2015/053460, filed on Dec. 11, 2015, which claims priority to and the benefit of FR 14/62234 filed on Dec. 11, 2014. The disclosures of the above applications are incorporated herein by reference.

FIELD

The present disclosure relates to a device for controlling a variable section ejection nozzle of a turbojet engine nacelle of an aircraft and a method for implementing such a device.

BACKGROUND

The statements in this section merely provide background information related to the present disclosure and may not constitute prior art.

A turbojet engine nacelle generally has a substantially tubular structure comprising an air inlet upstream of the turbojet engine, a mid-section intended to surround a fan of said turbojet engine, a downstream section intended to surround the combustion chamber of the turbojet engine and possibly integrating thrust reverser means, and is generally terminated by an ejection nozzle whose outlet is located downstream of the turbojet engine.

The modern nacelles are intended to accommodate a bypass turbojet engine capable of generating via the blades of the rotating fan a hot air flow (primary flow) and a cold air flow (secondary flow) which circulates outside the turbojet engine through an annular passage, also called a flow path, formed between a fairing of the turbojet engine and an inner wall of the nacelle. The two air flows are ejected from the turbojet by the backside of the nacelle.

The section of the ejection nozzle may be adapted depending on the different flight phases, namely in particular taking-off, climbing, cruising, descending and landing in order to always maintain an optimum nozzle section depending on the regime of the turbojet engine. The nozzle will then be called a variable nozzle.

Such a variable nozzle is associated to an actuating system allowing this section variation.

There are several solutions for producing a variable nozzle, in particular a variable nozzle with pivoting flaps or a variable nozzle with panels movable in translation and telescopically mounted, whose recoil or retraction similarly leads to the increase or the decrease of the outlet section.

The variable nozzle allows modulating the thrust of the turbojet engine by varying the output section thereof in response to variation of the adjustment of the power of the turbojet and of the flight conditions.

In order to control such a variable nozzle, two types of variable nozzles are in particular known, namely an open loop controlled variable nozzle and a closed loop controlled variable nozzle.

The open loop controlled variable nozzle receives a position setpoint of the nozzle depending on the flight regime, the nozzle being positioned in this position by a position servo-control or by predefined positions.

It is about an open loop servo-control, in particular for civil aircraft type applications intended to operate mainly in subsonic flow regime.

This type of open loop controlled variable nozzle has in particular the drawback of being inaccurate.

Indeed, distortions of the structure under load, the wear of the movable parts or the manufacturing tolerances may impact the accuracy of the system, leading to a difference between the given position setpoint and the actual value of the nozzle section, which generally cannot be measured directly.

This difference generally results in a decrease in the efficiency of the turbojet engine.

The closed loop controlled variable nozzle is driven in a position adjusted so as to verify a pressure setpoint at the inlet of the nozzle.

Such a closed loop servo-control is in particular associated to military or civil aircraft type applications intended to mainly operate in supersonic flow regime.

It is known an open loop control device of a variable nozzle which is described and represented in U.S. Pat. No. 3,030,771 and which allows controlling the position of the nozzle according to the measured fuel flow rate.

A closed loop servo-control for a subsonic civil application does not seem to be applicable for several reasons.

Indeed, the reliability, the response time and the accuracy of the pressure sensors used in civil aviation may be insufficient.

Furthermore, the need to continuously change the position of the nozzle during the flight may lead to a premature wear of the parts.

Finally, in open loop or in closed loop, such a servo-control assumes that the optimum efficiency of the turbojet engine is always obtained for the same variable nozzle position or for the same pressure for a given flight case, which is not necessarily true, because this optimum may depend on the state of wear of the motor.

SUMMARY

The present disclosure provides a control device of a variable section ejection nozzle of a turbojet engine nacelle of an aircraft, the device including:
  a calculator adapted to determine a position setpoint of the nozzle,
  means for actuating the nozzle which are associated to said calculator and which are adapted to control the position of the variable nozzle according to said position setpoint, characterized in that it comprises management system of the servo-control of the position of the variable nozzle depending on the flow rate of the fuel supplying the turbojet engine, said management system including at least one instantaneous flow rate sensor of the fuel and a management unit which is designed to:
  compare the flow rate measured by the flow rate sensor with a theoretical fuel flow rate depending on the parameters of the flight of the aircraft,
  determine a correction value of the position of the nozzle depending on the comparison of the measured flow rate and the theoretical fuel flow rate, and
  correct the position setpoint of the nozzle according to the correction value.

Thus, the device according to the present disclosure allows a servo-control with sufficient accuracy, enabling both civil or military and subsonic or supersonic use.

Moreover, the management system of the servo-control allows correcting the position setpoint by taking into account the state of wear of the turbojet engine and/or the nacelle.

Finally, in case of change of the nozzle on the same motor, adjustment may not be needed and the reliability of the system is not impacted by the reliability of the sensors as would be a closed loop system.

According to another feature of the present disclosure, the management unit is designed to vary the position of the nozzle in a plurality of positions and to measure the fuel flow rate for each adopted position, in order to determine the position offering improved operation efficiency of the turbojet engine.

This feature allows the device to adapt the position of the nozzle depending on the actual state of the propulsion unit constituted by the turbojet engine and the nacelle.

Furthermore, the management system includes a data storage unit which contains a data table of the theoretical fuel flow rate depending on the flight parameters of the aircraft.

The data table is adapted to be updated.

Also, the data storage unit allows recording the correction values of the position of the nozzle during several flights.

Furthermore, the management system includes an integrator which is adapted to calculate over time the integral of the measured fuel flow rate in order to refine the accuracy of said flow rate.

Advantageously, the device includes measuring means of the position of the variable nozzle.

The present disclosure also concerns a method for the implementation of a control device of the previously described type, the method including at least:
- one comparison step of the flow rate measured by the flow rate sensor with a theoretical fuel flow rate depending on the parameters of the flight,
- one determination step of a correction value of the position of the nozzle depending on the comparison of the measured flow rate and the theoretical flow rate of fuel,
- one correction step of the position setpoint of the nozzle according to the correction value obtained in the determination step.

Furthermore, the method includes a research step of improved operation which includes:
- varying the position of the nozzle in a plurality of different positions, according to different position setpoints of the nozzle, and
- measuring the fuel flow rate corresponding to each adopted position in order to determine improved efficiency of the turbojet engine.

Finally, the research step comprises a recording phase which includes recording the position allowing improved efficiency according to the determined flight parameters.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a cross-sectional view illustrating a turbojet engine nacelle equipped with a control device according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, schematically represented is a nacelle 10 which has a substantially tubular shape along a longitudinal axis A, and which comprises an upstream section 12 with an air inlet lip 14 forming an air inlet, a mid-section 16 surrounding a fan 18 of a turbojet engine 20 and a downstream section 22.

The downstream section 22 comprises an inner structure 24 surrounding the upstream portion of the turbojet engine 20 and an outer structure 26 which may support a movable cowl including thrust reverser means.

The inner structure 24 and the outer structure 26 delimit therebetween an annular flow path 28 allowing the passage of an air flow 30 penetrating the nacelle 10 at the air inlet.

The nacelle 10 of the present disclosure is terminated by a variable ejection nozzle 32, comprising an outer module 34 and an inner module 36, the inner 36 and outer 34 modules delimiting therebetween a hot air flow channel 38 exiting from the turbojet engine 20.

The nozzle 32 comprises movable flaps 40 disposed at the downstream end of the outer structure 26 and opposite to the annular flow path 30, each flap 40 being pivotally mounted so as to switch from an enlargement or reduction position of the section of the annular flow path 30.

Without limitation, the flaps 40 may be flaps sliding along the longitudinal axis A of the nacelle 10.

In order to drive the flaps 40 in movement, the nacelle 10 is equipped with actuating means 42 which comprise mechanical actuators of the cylinder, or ball screw type for example.

In accordance with the present disclosure, the nacelle 10 includes a control device 44 of the variable nozzle 32.

The control device 44 includes a calculator 46 which is adapted to determine a position setpoint of the variable nozzle 32 and which cooperates with the actuating means 42 in order to control the position of the nozzle 32 according to the position setpoint.

For information purpose only, the term "position of the nozzle" 32 means the position of the movable flaps 40 of the nozzle 32 varying the ejection section of the nozzle 32.

The position setpoint of the nozzle 32 is determined according to the flight parameters of the aircraft. These flight parameters gather several data among which the altitude of flight, the speed of the aircraft, the outside temperature, the external pressure, the regime of the turbojet engine, the speed of rotation of the drive shafts, etc.

The control device 44 also comprises management system of the servo-control of the position of the variable nozzle 32 depending on of the flow rate of the fuel supplying the turbojet engine 20.

To this end, the management system includes an instantaneous flow rate sensor 48 of the fuel consumed by the turbojet engine 20.

In order to refine the accuracy of the measurement of the instantaneous flow rate, the management system include an integrator (not represented) which allows calculating over time the integral of the measured fuel flow rate.

Furthermore, the management system includes an additional calculator forming a management unit 50 which is designed to compare the fuel flow rate measured by the flow rate sensor 48 with a theoretical fuel flow rate.

The theoretical flow rate of the fuel to be compared with the measured flow rate is determined depending on the parameters of the flight of the aircraft and corresponds to a flow rate allowing an improved operation efficiency of the turbojet engine.

Indeed, the efficiency of the turbojet engine 20 corresponds to the ratio between the theoretical flow rate and the measured flow rate of fuel.

Furthermore, the management unit 50 allows determining a correction value of the position of the nozzle 32 depending on the comparison of the measured flow rate and the theoretical fuel flow rate.

The correction value accordingly determined allows correcting the position setpoint of the nozzle 32, in order to increase or reduce the section of the nozzle 32.

The correction value is calculated such that the actual fuel flow rate is as close as possible to the theoretical flow rate, in order to operate the turbojet engine 20 at an improved efficiency.

Complementarily, the management system includes a data storage unit 52 which contains a data table of the theoretical fuel flow rate depending on the flight parameters of the aircraft and which allows updating the data table.

The storage unit 52 is for example an electronic circuit integrated with the management unit 50.

Advantageously, the data storage unit 52 allows recording the different correction values of the position of the nozzle 32 calculated for a flight phase and given flight parameters.

This recorded data may be applied again to future flights encountering a flight phase and flight parameters corresponding to those previously encountered.

In order to improve the reliability of the recorded correction values, the different correction values may be averaged over several flights and the values widely out of the average may be eliminated.

Similarly, a more significant weighting to the most recent flights may be given so as to take into account the recent deteriorations of the nozzle 32 or of the turbojet engine 20.

According to another aspect of the present disclosure, the management unit 50 allows varying the position of the nozzle 32 in a plurality of positions, the fuel flow rate being measured for each adopted position, in order to determine the position offering improved operation efficiency of the turbojet engine 20, with given flight parameters.

This action allows researching and determining improved operation efficiency of the turbojet engine 20 by taking into account the state of wear of the turbojet engine 20.

The position of the nozzle 32 may be either deduced according to the position setpoint transmitted to the actuating means 42 of the nozzle 32, or measured by a measuring means 54 of the position of the nozzle 32 provided for this purpose.

The present disclosure also concerns a method for the implementation of the control device 44, previously described.

The method includes a comparison step of the flow rate measured by the flow rate sensor 48 at a theoretical fuel flow rate depending on the parameters of the flight, by means of the management unit 50.

The comparison step is followed by a determination step of the correction value of the position of the nozzle 32 depending on the comparison of the measured flow rate and the theoretical fuel flow rate made during the comparison step.

Furthermore, the method includes a correction step of the position setpoint of the nozzle 32 according to the correction value obtained in the determination step.

The corrected position setpoint is transmitted to the actuating means 42 of the nozzle 32 in order to reduce or increase the section of the nozzle 32.

The correction value is calculated such that the actual fuel flow rate is as close as possible to the theoretical flow rate, in order to operate the turbojet engine 20 at an improved efficiency.

According to one form, the method includes an additional research step of improved operation which includes varying the position of the nozzle 32 in a plurality of different positions, according to different position setpoints of the nozzle 32, and in measuring the fuel flow rate corresponding to each adopted position in order to determine improved efficiency of the turbojet engine 20.

This research step also includes recording the position allowing improved efficiency according to the determined flight parameters, in the storage unit 52.

Thus, the recorded data may be applied to future flights encountering a flight phase and flight parameters corresponding to those previously encountered.

The research step may be carried out at regular intervals, for example once per flight.

The control device 44 as well as its implementation method allow overcoming the inaccuracies of positions of the nozzle 32 due, in particular, to the manufacturing tolerances, the wear and the distortions under loads of the different parts constituting the variable nozzle 32.

In particular, upon changing the nozzle 32 on a motor, adjustment may not be needed.

The enhanced accuracy of the position of the nozzle allows improved operation of the propulsion unit constituted by the turbojet engine 20 and the nacelle 10.

Advantageously, the reliability of the control device and the method according to the present disclosure is not impacted by the reliability of the different sensors and measuring means, as would be a closed loop system of the military aircraft or supersonic civil aircraft type.

The regulation by measuring the fuel flow rate may also compensate other parameters of deterioration of the turbojet engine, such as the increase in the clearances at the compressor blade tips or the deterioration of the turbine blades.

It will be noted that the mechanical wear of the turbojet engine may be characterized by an increase in the temperature of the exhaust gases of the primary flow, for a speed of rotation of the fan and the given flight parameters.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for controlling a variable section ejection nozzle of a turbojet engine nacelle of an aircraft, the device comprising:
   a calculator that determines a theoretical position setpoint of the nozzle based on flight parameters of the aircraft;

a device configured to actuate the nozzle and associated to said calculator, the device adapted to control a position of the nozzle according to the theoretical position setpoint;

a measuring device for measuring the position of the nozzle; and a management system including at least one instantaneous flow rate sensor for measuring an actual flow rate of fuel supplied to a turbojet engine and a management unit, wherein the management unit:

compares the actual flow rate measured by the at least one instantaneous flow rate sensor with a theoretical flow rate of fuel corresponding to the theoretical position setpoint of the nozzle;

determines a correction value of the position of the nozzle based on a comparison of the actual flow rate and the theoretical flow rate of fuel; and corrects a position setpoint of the nozzle according to the correction value such that a difference between the theoretical flow rate and the actual flow rate is reduced to compensate for inaccuracies in the position of the nozzle due to manufacturing tolerance and wear of the nozzle during operation.

2. The control device according to claim 1, wherein the management unit is operable to vary the position of the nozzle in a plurality of positions and to measure the actual flow rate for the position of the nozzle to determine a position offering improved operation efficiency of the turbojet engine based on the theoretical flow rate such that the difference between the theoretical flow rate and the actual flow rate is reduced.

3. The control device according to claim 1, wherein the management system further includes a data storage unit which contains a data table of the theoretical flow rate depending on the parameters of flight of the aircraft.

4. The control device according to claim 3, wherein the data table is adapted to be updated.

5. The control device according to claim 3, wherein the data storage unit is adapted to record the correction value of the position of the nozzle during several flights.

6. The control device according to claim 1, wherein the management system further includes an integrator adapted to calculate an integral of the measured actual flow rate over time to refine an accuracy of the measured actual flow rate.

7. A method for implementation of a control device of a variable section ejection nozzle of a turbojet engine nacelle of an aircraft, said device being in accordance with claim 1, the method comprising:

determining a theoretical position setpoint of the nozzle based on flight parameters of the aircraft;

actuating the nozzle to a position according to the theoretical position setpoint;

measuring the position of the nozzle;

comparing a flow rate measured by a flow rate sensor and a theoretical flow rate;

determining a correction value of the position of the nozzle based on the comparison of the measured flow rate and the theoretical flow rate; and correcting the position setpoint of the nozzle according to the correction value obtained in the determination step such that a difference between the theoretical flow rate and the measured flow rate is reduced to compensate for inaccuracies in the position of the nozzle due to manufacturing tolerance and wear of the nozzle during operation.

8. The method according to claim 7 further comprising determining an improved operation comprising:

varying the position of the nozzle in a plurality of different positions according to different position setpoints of the nozzle; and measuring the flow rate corresponding to the position of the nozzle to determine an enhanced efficiency of a turbojet engine based on the theoretical flow rate.

9. The method according to claim 8, wherein the step of determining an improved operation comprises a recording phase which includes recording a position allowing improved efficiency according to the flight parameters.

* * * * *